(12) United States Patent
Arnold

(10) Patent No.: US 8,159,199 B2
(45) Date of Patent: Apr. 17, 2012

(54) ON-CHIP VOLTAGE SUPPLY SCHEME WITH AUTOMATIC TRANSITION INTO LOW-POWER MODE OF MSP430

(75) Inventor: Matthias Arnold, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 253 days.

(21) Appl. No.: 12/166,401

(22) Filed: Jul. 2, 2008

(65) Prior Publication Data

US 2009/0195234 A1 Aug. 6, 2009

(30) Foreign Application Priority Data

Jul. 4, 2007 (DE) .......................... 10 2007 031 053

(51) Int. Cl.
*G05F 1/00* (2006.01)
(52) U.S. Cl. ...................................................... 323/269
(58) Field of Classification Search .................. 323/269, 323/272
See application file for complete search history.

(56) References Cited

U.S. PATENT DOCUMENTS

| 5,744,990 | A | * | 4/1998 | Burstein et al. ............... 327/143 |
| 7,248,533 | B2 | | 7/2007 | Aimoto |
| 7,319,601 | B2 | * | 1/2008 | Fagnani et al. ................. 363/49 |
| 2001/0054878 | A1 | | 12/2001 | Odaohhara |
| 2003/0011247 | A1 | | 1/2003 | Kajiwara et al. |
| 2003/0122532 | A1 | | 7/2003 | Yuan |
| 2006/0212137 | A1 | | 9/2006 | Sone |
| 2008/0116862 | A1 | * | 5/2008 | Yang et al. ...................... 323/269 |

FOREIGN PATENT DOCUMENTS

WO 2006102453 A 9/2006

OTHER PUBLICATIONS

Hidaka, A 34-ns 16-Mb DRAM with Controllable Voltage Down-Converter, IEEE Journal of Solid-State Circuits, vol. 27, No. 7, Jul. 1992.
Weinfurtner, Advanced Controlling Scheme for a DRAM Voltage Generator System, IEEE Journal of Solid-State Circuits, vol. 35, No. 4, Apr. 2000.
Office action issued by Deutsches Patent- und Markenamt regarding German Application No. 10 2007 031 053.8-32 dated May 8, 2009.

* cited by examiner

*Primary Examiner* — Jue Zhang
(74) *Attorney, Agent, or Firm* — William B. Kempler; Wade J. Brady, III; Frederick J. Telecky, Jr.

(57) ABSTRACT

An integrated electronic device includes circuitry for providing a system supply voltage from a primary power supply. The circuitry has a high power (HP) stage coupled to the primary power supply and having an output node coupled to a supply system node for providing a HP system supply voltage level and a HP output current such that the HP stage is configured to be active in a full power mode, and a low power (LP) stage coupled to the primary power supply and to the supply system node through a voltage follower for providing a LP supply voltage level and an LP output current such that the LP stage is configured to be active in a low power mode. The HP system supply voltage level is greater than the LP system supply voltage level and the voltage follower of the LP stage is adapted to switch off in response to a voltage level at the supply system node becoming greater than the HP system supply voltage level and to switch on in response to the voltage level at the supply system node becoming lower than the HP system supply voltage level.

16 Claims, 1 Drawing Sheet

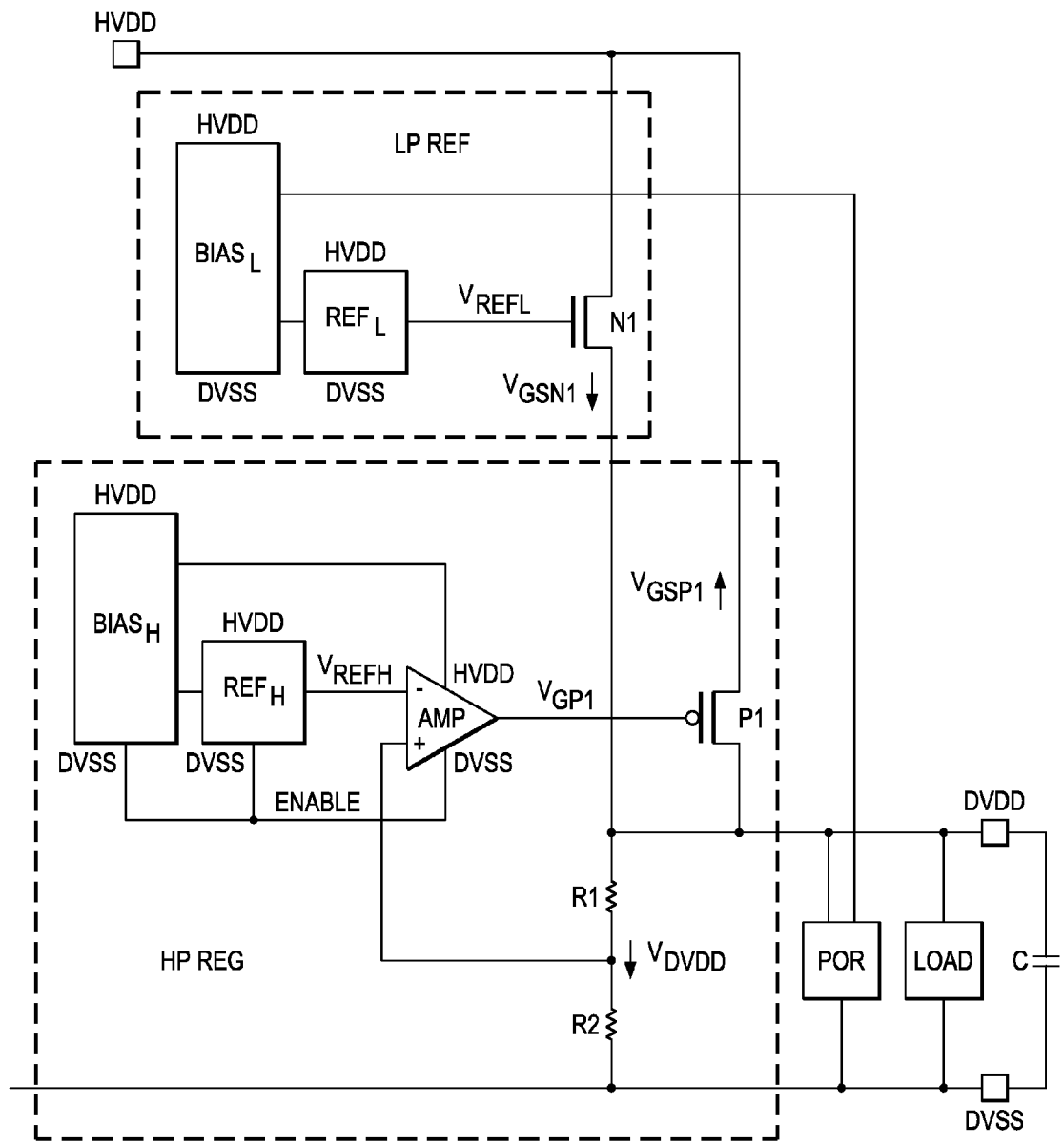

ON-CHIP VOLTAGE SUPPLY SCHEME WITH AUTOMATIC TRANSITION INTO LOW-POWER MODE OF MSP430

FIELD OF THE INVENTION

The present invention generally relates to an integrated electronic device including circuitry for providing a system supply voltage from a primary power supply. More particularly, the present invention relates to circuitry having a high power stage and a low power stage for supplying a voltage to a microcontroller in both high power and low power modes.

BACKGROUND OF THE INVENTION

Most of today's electronic devices comprise microcontrollers for controlling the circuitry in such devices and storing data. Particularly in portable devices, minimizing power consumption is of the utmost importance, since the batteries used for the power supplies are required to have very long lives of several years. In order to save power, microcontrollers are configured to have a low power mode when the device needs only limited power or is inactive. However, in the low power mode, it is still required to save and retain data. For data retention and operation in many microcontrollers, a low power voltage supply is required, having a static current of less than 1 µA and a maximum load current of 1 mA. For the active mode, a load current of 50 mA is required which needs an extra low dropout regulator (LDR). A mode switching mechanism is then required which switches between the active, or high power, mode and the low power mode. Timing of mode switching is critical since spikes during switching must not occur. Also, all of the required circuits must be powered up before usage, which requires a certain mode transition sequence. A problem with mode switching in existing microcontroller units is that there are two regulators or references which are selected by a multiplexer and these require dedicated control signals so that spikes do not occur during switching. Also, the dedicated control signals require special timing for mode transitions. Furthermore, such arrangements require the use of additional power, which is at a premium in portable electronic devices.

SUMMARY OF THE INVENTION

It is a general object of the present invention to provide an integrated electronic device including circuitry for providing a system supply voltage for different power requirements, which has a simplified operating mode control and seamless transition between the different power modes, and that has a simple and robust structure.

Accordingly, the present invention provides an integrated electronic device including circuitry for providing a system supply voltage from a primary power supply. The circuitry comprises a high power (HP) stage coupled to the primary power supply and having an output node coupled to a supply system node for providing a HP system supply voltage level and a HP output current such that the HP stage is configured to be active in a full power mode, and a low power (LP) stage coupled to the primary power supply and to the supply system node through a voltage follower for providing a LP supply voltage level and a LP output current such that the LP stage is configured to be active in a low power mode. The HP system supply voltage level is greater than the LP system supply voltage level and the voltage follower of the LP stage is adapted to switch off in response to a voltage level at the supply system node becoming greater than the LP system supply voltage level and to switch on in response to the voltage level at the supply system node becoming lower than the LP system supply voltage level. The HP stage can be any type of voltage regulator and the LP stage can be any type of voltage reference with a subsequent voltage follower. The criteria are that the maximum output current is higher for the HP stage in full; i.e., active, power mode than in low power mode and that the maximum output current of the LP stage is lower in a low power mode than in a full power mode. The outputs of both, the HP and LP stages are connected to the supply system output. During transition into the low power mode, the voltage follower of the LP stage automatically takes over to supply the voltage at the supply system node at a predetermined threshold voltage. When switching to the high power or active mode, the voltage follower becomes automatically disabled when the high power stage with its higher current drive capability pulls the supply voltage level to the higher final value. For example, this can be implemented by use of voltage follower, which switches off if a required voltage drop (somewhere across the voltage follower itself) becomes smaller than a predetermined threshold voltage (e.g. a MOS transistor, the gate-source voltage of which is reduced below the necessary threshold voltage). The low power stage provides a fairly accurate reference voltage and has a very low static current consumption. So, the low power stage can remain switched on, even if the high power stage takes over the power supply. For the high power stage a band gap based voltage regulator can be used, which can be switched off. If the high power stage is switched off, the low power stage takes over the supply of the connected circuits automatically. This provides the advantage of a simplified operating mode control, due to the automatic enabling and disabling of the low power stage. Also, the operation is free of spikes during transitions between the two modes. Furthermore, since there is only one startup when the system is powered on, a very low power implementation is possible.

In one aspect of the invention, the voltage follower is a NMOS transistor having a drain coupled to the primary power supply and a source coupled to the system supply node. The NMOS source follower can be chosen such that the supply voltage in the active mode is above the reference voltage minus the threshold voltage of the follower. If the main power is switched off, the NMOS follower automatically takes over when its gate to source voltage exceeds the NMOS threshold voltage. When switching to active mode, the NMOS follower is automatically disabled by its gate to source voltage being less than the predetermined threshold voltage, when the high power regulator reaches its final value. Preferably, the HP stage comprises a PMOS transistor having a source coupled to the primary power source and a drain coupled to the supply system node. Since the PMOS transistor requires a much higher gate source threshold voltage to be switched on, the low power stage will automatically take over supply of the system supply voltage when the gate to source voltage of the PMOS transistor drops below the threshold level.

The HP stage can comprise an amplifier for amplifying a reference voltage to serve as a gate voltage for the PMOS transistor. This ensures that the maximum output current of the high power stage is greater than the maximum current of the low power stage. This can also be achieved by selective dimensioning of the HP stage and the LP stage so that the maximum HP current is greater than the maximum LP output current.

Preferably, the device further comprises a power on reset stage coupled to the supply system node. In this way, the state of the system can always be reset if, at start up, the device is in an indeterminate state. The high power stage can be also be adapted to receive an enable signal to be switched off in a power down mode, which allows a further power saving to be achieved.

The present invention also provides a method of providing a system supply voltage. The method comprises providing a LP system supply voltage level at a system supply node from a primary power source vial LP stage in a low power mode, providing a HP system supply voltage level from the primary power source via HP stage in a full power mode, disabling the LP stage in response to the HP stage driving the system supply voltage at the supply system node through a voltage level greater than the LP system supply voltage level, and automatically enabling the LP stage when the system supply voltage at the supply system node is lower than the LP system supply voltage level. Automatic enabling of the LP stage provides a simplified mode control scheme, since no separate switching circuitry is required. Preferably, the LP stage uses a voltage follower, e.g. an NMOS transistor connected as a voltage follower, in the output stage for providing the LP output voltage.

BRIEF DESCRIPTION OF THE DRAWINGS

Further advantages and characteristics of the invention ensue from the description below of a preferred embodiment, and from the accompanying drawing in which:

FIG. 1 is a simplified schematic of the circuitry for providing a system supply voltage from a primary power supply according to the invention.

DETAILED DESCRIPTION

FIG. 1 shows a circuitry for providing a system supply voltage. A low power stage LP REF and a high power stage HP REG both have input nodes coupled to a primary power supply voltage rail HVDD. The output nodes of both the low power stage LP REF and the high power stage HP REG are coupled to a system supply node $V_{DVDD}$, from which an output voltage is supplied to a load Load. The high power stage HP REG comprises an amplifier Amp, having a negative input operable to receive a reference voltage $V_{REFH}$, which is supplied by enable mode circuitry shown schematically here as blocks $Bias_H$ and $Ref_H$. The enable mode circuitry also supplies the enablement pins of the amplifier Amp. The positive terminal of the amplifier Amp is also connected to the supply system node $V_{DVDD}$ via a resistive divider comprised of resistors R1 and R2 so that the amplifier Amp is operable to receive a feedback voltage from the supply system node $V_{DVDD}$ and acts as a comparator. The output voltage $V_{GP1}$ of the amplifier Amp is then supplied to the gate of a PMOS transistor P1. The drain and source of the transistor P1 are connected between primary power supply voltage rail HVDD and the supply system node $V_{DVDD}$.

The low power stage LP REF can be any type of voltage reference with a subsequent voltage follower. In this case the voltage follower is an NMOS transistor with drain and source connected between the primary power supply voltage rail HVDD and the supply system voltage node $V_{DVDD}$. A bias generating circuit in the low power stage LP REF, shown schematically by here by blocks $Bias_L$ and $Ref_L$, generates a reference voltage $V_{REFL}$ operable to be applied to the gate of the NMOS transistor N1. A power on reset generator POR and an output capacitor C are connected between the supply system node $V_{DVDD}$ and a negative supply voltage rail DVSS in parallel with a load to be supplied by the device, as well as with the resistive divider, comprised of resistors R1 and R2. The power on reset generator POR is provided to generate a reset signal to reset the load in case it is in an indeterminate state during switch-on or power-up and the output capacitor C is for smoothing the output voltage at the system supply node $V_{DVDD}$.

Predetermined conditions set in the high power stage HP REG and the low power stage LP REF mean that the system output of the high power stage HP REG, when the microcontroller is in full power mode (FPM), is such that $V_{DVDD}$ is equal to $V_{REFH}$ multiplied by an arbitrary factor, and that the maximum output current is higher than when the device is in low power mode. When the microcontroller is in low power mode (LPM), a condition is that, in the low power stage LP REF the system output $V_{DVDD}$ is equal to the reference voltage $V_{REFL}$ subtracted by the threshold voltage $V_{THN1}$ of the NMOS follower transistor N1 and that the maximum output current is lower than when the device is in full power mode. The low power stage LP REF comprises a voltage reference circuit REFL, optionally with an associated bias circuit $Bias_L$ at the gate of the NMOS voltage follower transistor N1, chosen such that the resulting supply system output voltage $V_{DVDD}$ in the high or full power mode of the device is larger than the reference voltage $V_{REFL}$ minus the threshold voltage $V_{THN1}$ of the follower transistor N1. In other words $$V_{DVDD}(\text{LPM}) < V_{DVDD}(\text{FPM})$$

During transition into low power mode, when the high power source HP REG is switched off by setting $V_{GSP1}$ to be greater than $V_{THP1}$ (the gate to source threshold voltage of the PMOS transistor P1), the NMOS follower transistor N1 automatically takes over to supply $V_{DVDD}$ when its gate to source voltage GSN1 exceeds the NMOS threshold voltage $V_{THN1}$. When switching to the active or full power mode by setting $V_{GSP1}$ to be greater than $V_{THP1}$, the NMOS follower transistor N1 becomes automatically disabled when the high power stage HP REG with its higher current drive capability pulls $V_{DVDD}$ to the higher final voltage value. This is because the gate to source voltage $V_{GSN1}$ of the NMOS voltage follower transistor N1 is equal to $V_{REFL} - V_{DVDD}$ and this value becomes smaller than threshold voltage $V_{THN1}$. Therefore, the circuitry switches automatically from full power mode to low power mode and vice-versa.

Although the present invention has been described hereinabove with reference to a particular embodiment, it is not limited to this embodiment and no doubt further alternatives will occur to the skilled person that lie within the invention as claimed. For example the PMOS transistor P1 at the output of the high power stage HP REG can be replaced by an NMOS transistor. When an NMOS transistor is used, the polarities of the input terminals of the amplifier Amp are reversed, compared to those shown in FIG. 1. Further, it is not necessary to use the resistive divider comprising the resistors R1 and R2—the positive input terminal of the amplifier Amp may be directly connected to supply system node $V_{DVDD}$. In this case, the reference voltage $V_{REFH}$ must be equal to the supply voltage in full power mode $V_{DVDD}$ (FPM); i.e., $V_{REFH} = V_{DVDD}$ (FPM).

The invention claimed is:

1. An integrated electronic device including circuitry for providing a single system supply voltage from a primary power supply, the circuitry comprising:
   a high power (HP) stage coupled to the primary power supply and receiving the single system supply voltage and having an output node coupled to a supply system node for providing a HP system supply voltage level and a HP output current such that the HP stage is configured to be active in a full power mode; and a low power (LP) stage coupled to the primary power supply for receiving the single system supply voltage and to the supply system node through a voltage follower for following a continuous fixed bias voltage and providing a LP supply voltage level and an LP output current such that the LP stage is configured to be active in a low power mode, wherein the HP system supply voltage level is greater than the LP system supply voltage level and the voltage follower of the LP stage is back-biased to switch off in response to a voltage level at the supply system node becoming greater than the HP system supply voltage level and to be forward-biased and switch on in response to the voltage level at the supply system node becoming lower than the HP system supply voltage level, wherein the HP stage comprises a PMOS transistor having a source coupled to the primary power source and a drain coupled to the supply system node, wherein the circuit provides a smooth spike free transition from the high power mode to the low power mode.

2. The integrated electronic device according to claim 1, wherein the voltage follower is a NMOS transistor having a drain coupled to the primary power supply and a source coupled to the supply system node.

3. The integrated electronic device according to claim 1, wherein the HP stage comprises an amplifier for amplifying a reference voltage to serve as a gate voltage for the PMOS transistor.

4. An integrated electronic device including circuitry for providing a single system supply voltage from a primary power supply, the circuitry comprising:

a high power (HP) stage coupled to the primary power supply and receiving the single system supply voltage and having an output node coupled to a supply system node for following a continuous fixed bias voltage and providing a HP system supply voltage level and a HP output current such that the HP stage is configured to be active in a full power mode; and a low power (LP) stage coupled to the primary power supply for receiving the single system supply voltage and to the supply system node through a voltage follower for providing a LP supply voltage level and an LP output current such that the LP stage is configured to be active in a low power mode, wherein the HP system supply voltage level is greater than the LP system supply voltage level and the voltage follower of the LP stage is back-biased to switch off in response to a voltage level at the supply system node becoming greater than the HP system supply voltage level and to be forward-biased and switch on in response to the voltage level at the supply system node becoming lower than the HP system supply voltage level, wherein the HP stage and the LP stage are dimensioned such that the maximum HP output current is greater than the maximum LP output current, wherein the circuit provides a smooth spike free transition from the high power mode to the low power mode; and further comprising a power on reset stage coupled to the supply system node.

5. The integrated electronic device according to claim 1, further comprising a power on reset stage coupled to the supply system node.

6. The integrated electronic device according to claim 1, wherein the HP stage is adapted to receive an enable signal to be switched off in going to a mode.

7. The integrated electronic device according to claim 2, wherein the HP stage and the LP stage are dimensioned such that the maximum HP output current is greater than the maximum LP output current.

8. The integrated electronic device according to claim 1, wherein the HP stage and the LP stage are dimensioned such that the maximum HP output current is greater than the maximum LP output current.

9. The integrated electronic device according to claim 3, wherein the HP stage and the LP stage are dimensioned such that the maximum HP output current is greater than the maximum LP output current.

10. The integrated electronic device according to claim 2, further comprising a power on reset stage coupled to the supply system node.

11. The integrated electronic device according to claim 1, further comprising a power on reset stage coupled to the supply system node.

12. The integrated electronic device according to claim 3, further comprising a power on reset stage coupled to the supply system node.

13. The integrated electronic device according to claim 4, further comprising a power on reset stage coupled to the supply system node.

14. The integrated electronic device according to claim 2, wherein the HP stage is adapted to receive an enable signal to be switched off in a power down mode.

15. The integrated electronic device according to claim 1, wherein the HP stage is adapted to receive an enable signal to be switched off in a power down mode.

16. The integrated electronic device according to claim 3, wherein the HP stage is adapted to receive an enable signal to be switched off in a power down mode.

* * * * *